(12) United States Patent  
Zhang

(10) Patent No.: US 9,740,279 B2
(45) Date of Patent: Aug. 22, 2017

(54) METHOD FOR ADJUSTING VOLUME OF A DISPLAY DEVICE AND A DISPLAY DEVICE

(71) Applicant: Boe Technology Group Co., Ltd., Beijing (CN)

(72) Inventor: Kailiang Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/904,721

(22) PCT Filed: Jul. 17, 2015

(86) PCT No.: PCT/CN2015/084283
§ 371 (c)(1),
(2) Date: Jan. 13, 2016

(87) PCT Pub. No.: WO2016/127573
PCT Pub. Date: Aug. 18, 2016

(65) Prior Publication Data
US 2016/0274657 A1    Sep. 22, 2016

(30) Foreign Application Priority Data
Feb. 13, 2015 (CN) ................ 2015 1 0079263

(51) Int. Cl.
*G06F 3/01* (2006.01)
*H04N 21/439* (2011.01)
*H04N 21/442* (2011.01)

(52) U.S. Cl.
CPC ........... *G06F 3/011* (2013.01); *H04N 21/439* (2013.01); *H04N 21/44218* (2013.01)

(58) Field of Classification Search
CPC . G06F 3/011; H04N 21/439; H04N 21/44218
See application file for complete search history.

(56) References Cited

U.S. PATENT DOCUMENTS 4,831,448 A *  5/1989  Park ...................... G01S 17/89
                                            340/555
8,990,671 B2 * 3/2015  Karmarkar ............ H04L 63/104
                                            715/201

(Continued)

FOREIGN PATENT DOCUMENTS

CN        2682752 A    3/2005
CN        1668088 A    9/2005
(Continued)

OTHER PUBLICATIONS

International Search Report and Written Opinion from PCT/CN2015/084283 dated Nov. 11, 2015.

(Continued)

*Primary Examiner* — Dmitriy Bolotin
(74) *Attorney, Agent, or Firm* — Calfee, Halter & Griswold LLP

(57) ABSTRACT

The present invention discloses a method of adjusting a volume of a display device and a display device, which can adjust the volume of the display device intelligently. The method of adjusting the volume of the display device comprises the steps of: firstly detecting a distance between the viewer and the display device, then determining a target volume to which the distance corresponds, finally adjusting the playing volume of the display device as the target volume.

13 Claims, 3 Drawing Sheets

(56) References Cited

U.S. PATENT DOCUMENTS

| | | | |
|---|---|---|---|
| 9,420,373 B2* | 8/2016 | Lee | H04R 5/04 |
| 2007/0160222 A1* | 7/2007 | Trepte | H04S 7/302 |
| | | | 381/61 |
| 2011/0069841 A1 | 3/2011 | Angeloff et al. | |
| 2011/0154385 A1* | 6/2011 | Price | H04H 60/45 |
| | | | 725/12 |
| 2011/0235807 A1* | 9/2011 | Hayashi | H04R 5/04 |
| | | | 381/17 |
| 2012/0230525 A1* | 9/2012 | Higuchi | H04N 5/602 |
| | | | 381/303 |
| 2014/0078404 A1 | 3/2014 | Cheung | |
| 2014/0321680 A1* | 10/2014 | Takahashi | H04S 7/304 |
| | | | 381/303 |
| 2015/0381689 A1* | 12/2015 | Ganesh | G06Q 30/0261 |
| | | | 705/14.58 |
| 2016/0253146 A1 | 9/2016 | Yang | |

FOREIGN PATENT DOCUMENTS

| | | |
|---|---|---|
| CN | 1889655 A | 1/2007 |
| CN | 101312600 | 11/2008 |
| CN | 101442636 A | 5/2009 |
| CN | 101483413 A | 7/2009 |
| CN | 202077122 A | 12/2011 |
| CN | 102577433 | 7/2012 |
| CN | 102833505 A | 12/2012 |
| CN | 102981422 A | 3/2013 |
| CN | 103377673 A | 10/2013 |
| CN | 103634720 | 3/2014 |
| CN | 103634720 | 3/2014 |
| CN | 104010147 A | 8/2014 |
| CN | 104125325 A | 10/2014 |
| CN | 104618796 | 5/2015 |

OTHER PUBLICATIONS

First Office Action from Chinese Patent Application No. 201510079263.0 dated Apr. 7, 2017.

* cited by examiner

METHOD FOR ADJUSTING VOLUME OF A DISPLAY DEVICE AND A DISPLAY DEVICE

RELATED APPLICATIONS

The present application is the U.S. national phase entry of PCT/CN2015/084283, with an international filing date of Jul. 17, 2015, which claims the benefit of Chinese Patent Application No. 201510079263.0, filed on Feb. 13, 2015, the entire disclosures of which are incorporated herein by reference.

FIELD OF THE INVENTION

The present invention relates to the field of display technology, particularly to a method for adjusting volume of a display device and a display device.

BACKGROUND OF THE INVENTION

With the development of the display technology, display devices such as televisions have been more and more widely used. The television is a device that converts the received broadcast signal into image information and audio information and presents it to the audience.

However, when a viewer is watching TV, he may move within the effective viewing range to view the image and listen to the sound, or may only listen to the sound outside the effective viewing range. When the distance between the viewer and the television changes, the television volume that can be heard by the viewer will also change accordingly. Here, the viewer needs to adjust the volume of the television manually through a remote controller, so as to meet the listening requirement of his own, which results in a relatively bad user experience.

SUMMARY OF THE INVENTION

The object of the present invention lies in overcoming the above problems and defects existing in the display device such as television of the prior art, so as to realize intelligent adjustment to the volume of the display device.

According to a first aspect of the present invention, a method for adjusting volume of a display device is provided, comprising the steps of: detecting a distance between a viewer and the display device; determining a target volume to which the detected distance corresponds; adjusting the volume of the display device as the target volume.

Compared with the prior art in which the viewer needs to adjust the volume manually, the volume adjusting method according to the present invention can adjust the playing volume of the display device as a volume suitable for listening by the viewer based on the distance between the viewer and the display device, so as to realize intelligent adjustment of the display device volume and enhance the user experience significantly.

In an embodiment of the method for adjusting volume of a display device according to the present invention, the steps of determining a target volume to which the detected distance corresponds comprises the steps of: establishing a corresponding relationship between each different distance of the viewer to the display device and respective different target volume, and determining the target volume to which the detected distance corresponds based on the determined corresponding relationship.

In an embodiment of the method for adjusting volume of a display device according to the present invention, the step of determining a corresponding relationship between the distance of the viewer to the display device and the target volume may comprise: when the viewer adjusts the volume at a certain position, detecting a first distance between the viewer and the display device, and obtaining a first volume adjusted by the viewer; and establishing a corresponding relationship between each different distance of the viewer to the display device and respective different target volume based on the first distance and the first volume, as well as a predetermined volume adjustment step length.

In addition, in the above embodiment, the step of determining a corresponding relationship between the distance of the viewer to the display device and the target volume may also comprise: when the viewer adjusts the volume at a certain position, detecting a first distance between the viewer and the display device, and obtaining a first volume adjusted by the viewer; when the viewer adjusts the volume at another position, detecting a second distance between the viewer and the display device, and obtaining a second volume adjusted by the viewer; in the event that the second distance is not equal to the first distance, calculating a volume adjustment step length based on the first distance, the second distance, the first volume and the second volume; and establishing a corresponding relationship between each distance and respective target volume based on the first distance and the first volume as well as the volume adjustment step length.

In an embodiment of the method for adjusting volume of a display device according to the present invention, the first distance is an optimal viewing distance, a value of the optimal viewing distance is three times of a height value of the display device.

In an embodiment of the method for adjusting volume of a display device according to the present invention, the method may further comprise: if no viewer is detected within the effective viewing range of the display device, adjusting a playing volume of the display device as a volume to which the optimal viewing distance corresponds.

In an embodiment of the method for adjusting volume of a display device according to the present invention, the method may further comprise: if no viewer is detected within the effective viewing range of the display device, adjusting a playing volume of the display device as a preset high volume.

In an embodiment of the method for adjusting volume of a display device according to the present invention, the step of adjusting the volume of the display device as the determined target volume comprises: adjusting the volume of the display device as the target volume according to the manner of gradual adjustment.

In an embodiment of the method for adjusting volume of a display device according to the present invention, the method further comprises: if a plurality of viewers are detected within the effective viewing range, detecting a distance difference of every two viewers in the plurality of viewers to the display device; if the distance difference of any two viewers to the display device is greater than a preset distance, obtaining a minimum distance in the distances between the plurality of viewers and the display device respectively, and determining a volume to which the minimum distance corresponds as the target volume; otherwise, if there is a distance difference of two or more viewers to the display device less than or equal to the preset distance, obtaining an average value of the distances between these viewers and the display device respectively, and determining a volume to which the average value corresponds as the target volume.

According to a second aspect of the present invention, a display device capable of intelligently adjusting the volume is provided, the display device comprising: a sensor, a control unit and an audio output unit; wherein the sensor is used for detecting a distance between the display device and a viewer, and transmitting the detected distance to the control unit; the control unit is used for determining a target volume to which the distance corresponds, and transmitting the target volume to the audio output unit; the audio output unit is used for outputting audio information based on the target volume.

In an embodiment of the display device according to the present invention, the sensor can be arranged at a central position above the front of the display device, while the audio output unit can be arranged exactly under the display device; or the audio output unit comprises a first audio output sub-unit and a second audio output sub-unit, the first audio output sub-unit and the second audio output sub-unit are located at two sides of the display device respectively.

In an embodiment of the display device according to the present invention, the control unit can be further used for receiving a volume adjustment instruction transmitted by a remote controller used in cooperation with the display device, and establishing a corresponding relationship between each different distance and respective different volume based on the volume adjustment instruction and the current distance between the viewer and the display device.

In an embodiment of the display device according to the present invention, the sensor can be an infrared sensor, a pyroelectric sensor or a proximity sensor, or any other sensors that can implement the distance sensing function.

BRIEF DESCRIPTION OF THE DRAWINGS

The drawings illustrated here are used for providing further understanding to the present invention, and constitute a part of the present invention. The schematic embodiments of the present invention are used for explaining the present invention while not constituting definition to the present invention. In the drawings.

REFERENCE SIGNS 30-display device, 31-sensor, 32-control unit, 33-audio output unit, 331-first audio output sub-unit, 332-second audio output sub-unit.

DETAILED DESCRIPTION OF THE INVENTION

Next, the technical solutions in the embodiments of the present invention will be described clearly and completely in combination with the drawings in the embodiments of the present invention. Apparently, the embodiments described are only part of rather all of the embodiments of the present invention. Based on the embodiments in the present invention, all of other embodiments, obtained by the ordinary skilled person in the art on the premise of not paying any creative work, belong to the protection scope of the present invention.

Figure 1:
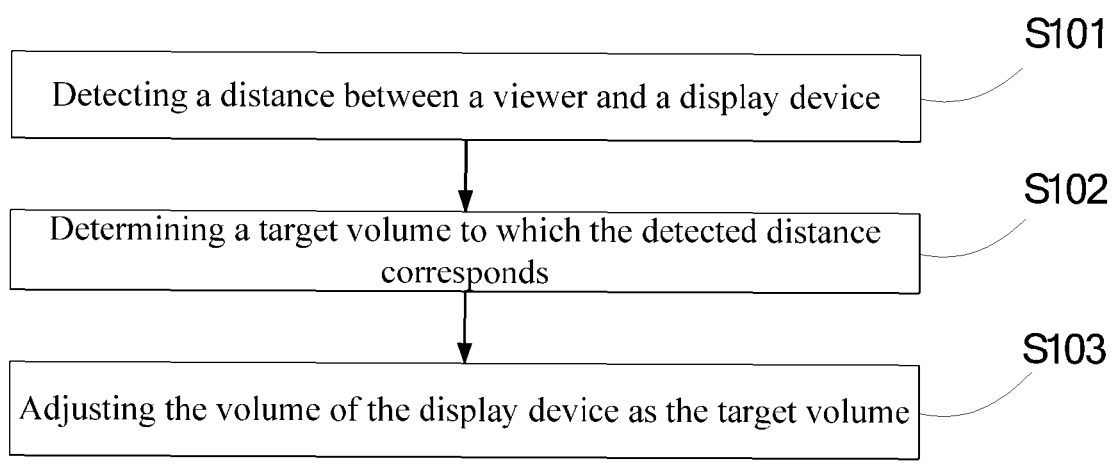
FIG. 1 shows a flow chart of a method for adjusting volume of a display device according to a first embodiment of the present invention.

FIG. 1 shows a flow chart of a method for adjusting volume of a display device according to a first embodiment of the present invention. The method can adjust the volume of the display device intelligently. As shown in FIG. 1, the volume adjusting method comprises the steps of:

S101, detecting a distance between a viewer and a display device;

S102, determining a target volume to which the distance corresponds;

S103, adjusting the volume of the display device as the target volume.

In step S101, the distance between the viewer and the display device can be detected through a sensor. The sensor for example may be an infrared sensor, a pyroelectric sensor or a proximity sensor and so on, wherein the sensor may be located at a central position above the front of the display device.

Prior to step 102, the method for adjusting volume of a display device according to the present invention may further comprise: pre-storing a respective target volume suitable for listening when the viewer is at each different distance (or different distance interval) from the display device respectively, i.e., a corresponding relationship between the distance of the viewer to the display device and the respective target volume. Specifically, the corresponding relationship between each different distance (or different distance interval) and respective target volume can be detected through pre-experiment and stored in the control unit of the display device.

It should be noted that the method for adjusting volume of a display device according to a first embodiment of the present invention can be carried out by the display device per se, and can also be carried out by other devices integrated with the above functions independent of the display device.

Compared with the prior art in which the viewer needs to adjust the volume manually, the display device volume adjusting method according to the present invention can adjust the volume of the display device as a volume suitable for listening by the viewer based on the distance between the viewer and the display device, so as to realize intelligent adjustment of the display device volume and enhance the user experience significantly.

In an embodiment of the method for adjusting volume of a display device according to the present invention, in the step of S103 of adjusting the volume to the target volume, the playing volume of the display device can be adjusted as the target volume according to a gradual manner. With the gradual adjustment manner, the volume can be gradually increased or reduced, so that the user is adapted for the adjusted volume gradually, thereby effectively avoiding shock to the user eardrum due to sudden overlarge volume and enhancing user experience.

In an embodiment of the method for adjusting volume of a display device according to the present invention, in step S102, if the viewer is not detected within the effective viewing range of the display device, it shows that the viewer might be outside the effective viewing range, then the target volume can be determined as a volume to which the maximum effective viewing range distance corresponds. For example, the playing volume of the display device is adjusted as a preset high volume, thus the user outside the effective viewing range can hear the played audio information.

The above embodiments are mainly directed at the situation in which a single user views the display device, it will be introduced in the following how the volume is adjusted when two or more viewers view the display device simultaneously.

For the situation in which two persons view the display device simultaneously, generally, if the distance between the two persons is relatively small or the difference between the distances of the two persons to the display device is relatively small, the volume can be adjusted based on the average value of the distances of the two persons to the display device, so as to give consideration to the auditory experience of the two persons simultaneously; while if the distance between the two persons is relatively large or the difference between the distances of the two persons to the display device is relatively large, the above volume adjustment manner will not be applicable, because such an adjusting manner may cause the volume heard by the relatively close person overlarge, which is uncomfortable and may even cause damage to the eardrum. Therefore, with respect to the situation in which the distance between the two persons is relatively large, the volume can be adjusted according to the distance of the relatively close person to the display device, so as to avoid discomfort or damage caused by overlarge volume heard by the relatively close person. Here, the degree of distance or of closeness between the two persons can be determined by presetting a preset distance. For example, if two users watch TV simultaneously, e.g., the preset distance can be set as 100 cm, assume that the distances of the two person to the display device are D1 and D2 respectively and D1>D2, if the distance difference of the two persons to the television D1−D2>100 cm, the volume will be adjusted according to the user distance D2 which is closest to the television; and if the distance difference of the two users to the television D1−D2<=100 cm, the volume will be adjusted according to the intermediate distance (D1+D2)/2 of the two users.

Further, for the situation in which a plurality of persons view the display device simultaneously, the distance difference of every two viewers in the plurality of viewers to the display device respectively can be detected. If the distance difference of any two viewers to the display device is greater than the preset distance, a minimum distance in the distances between the plurality of viewers to the display device respectively is obtained, and the volume to which the minimum distance corresponds is determined as the target volume; otherwise, if the distance difference of two or more viewers to the display device is less than or equal to the preset distance, an average value of the distances between these viewers and the display device respectively is obtained, and the volume to which the average value corresponds is determined as the target volume.

Figure 2:
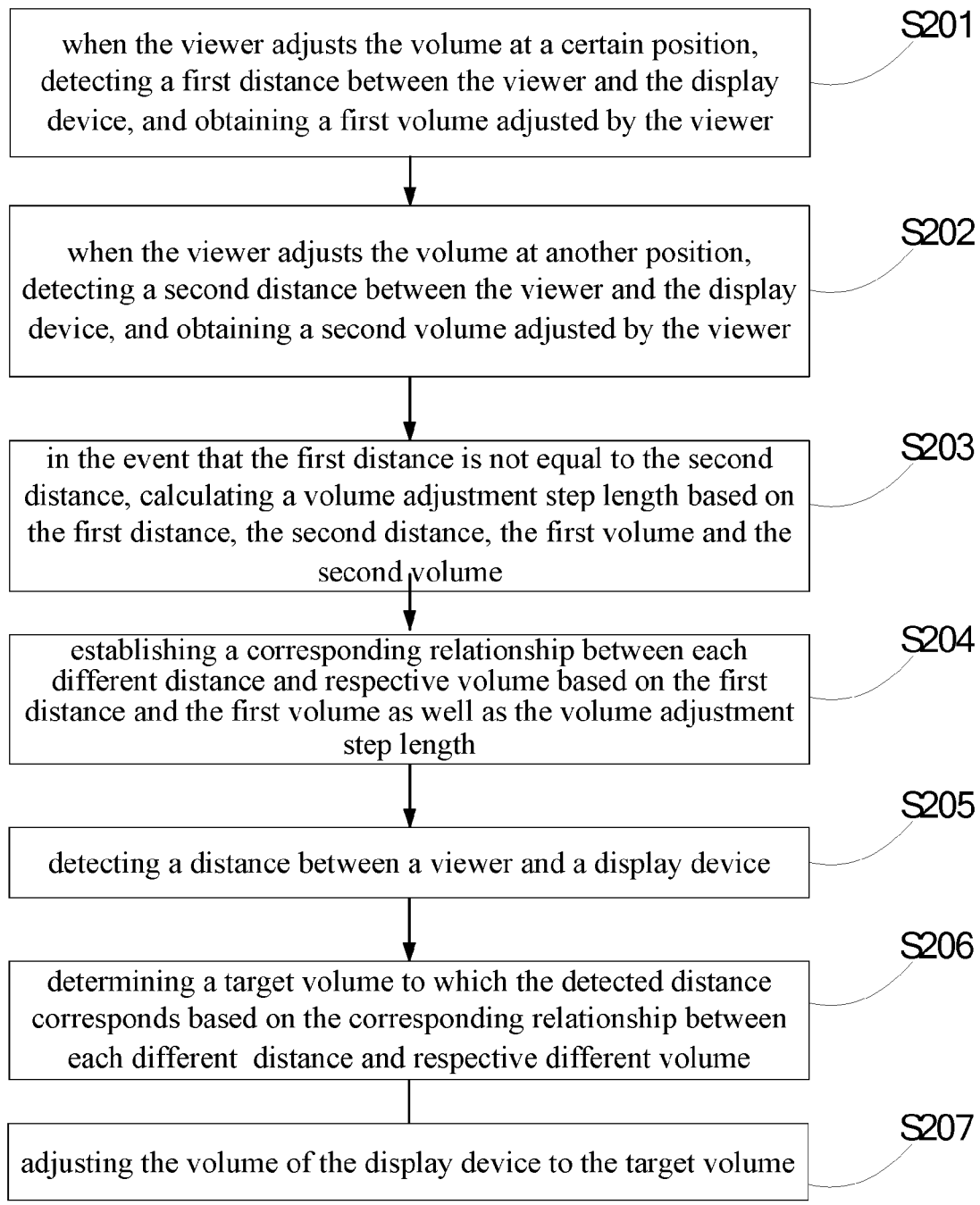
FIG. 2 shows a flow chart of a method for adjusting volume of a display device according to a second embodiment of the present invention.

FIG. 2 shows a flow chart of a method for adjusting volume of a display device according to a second embodiment of the present invention. The difference between the method as shown in FIG. 2 and FIG. 1 lies in adding a step of establishing a corresponding relationship (such as a functional relationship) between the distance of the viewer to the display device and the volume of the display device through the process of adjusting the volume by the user manually, i.e., adding a step of determining the above corresponding relationship prior to the step S102 in the method as shown in FIG. 1.

As shown in FIG. 2, the volume adjusting method according to a second embodiment of the present invention comprises the steps of: S201, when the viewer adjusts the volume at a certain position, detecting a first distance between the viewer and the display device, and obtaining a first volume adjusted by the viewer; S202, when the viewer adjusts the volume at another position, detecting a second distance between the viewer and the display device, and obtaining a second volume adjusted by the viewer; S203, in the event that the first distance is not equal to the second distance, calculating a volume adjustment step length based on the first distance, the second distance, the first volume and the second volume; S204, establishing a corresponding relationship between each distance and volume based on the first distance and the first volume as well as the volume adjustment step length.

In step S201, the detected first distance might be the optimal viewing distance of the television, i.e., three times of the height of the display device. For example, if the display device is a television of 42 inches and the height of the television is 50 cm, then the corresponding optimal viewing distance of the television will be 150 cm.

In step S203, for example, the first distance is 150 cm, the second distance is 300 cm, the first volume is 10, the second volume is 13, then the corresponding volume adjustment step length is (300−150)cm/(13−10)volume=50 cm/volume, i.e., if the distance between the viewer and the display device is increased by 50 cm every time, the volume will be increased by 1. Here, in step S204, the calculated corresponding relationship between the distance and the volume is: s=(d−150)/50+10, wherein s is the volume, d is the distance and is greater than zero, i.e., the distance and the volume are in a linear relationship.

In the above text, the corresponding relationship between the distance of the user to the display device and the display device volume is determined based on user personal preference by recording the process of adjusting the volume by the user manually with reference to the steps S201-S204 as shown in FIG. 2. In this way, a corresponding individualized corresponding relationship between the distance and the volume can be determined based on the personal requirements of different viewers, thereby realizing automated, intelligentized and individualized adjustment to the volume of the display device in combination with the method for adjusting the volume of the display device as shown in FIG. 1.

As shown in FIG. 2, the method for adjusting volume of a display device according to the second embodiment of the present invention may further comprise the steps of: S205, detecting a distance between a viewer and a display device; S206, determining a target volume to which the detected distance corresponds based on the determined corresponding relationship between the distance of the viewer to the display device and the display device volume; S207, adjusting the volume of the display device to the target volume.

Figure 3:
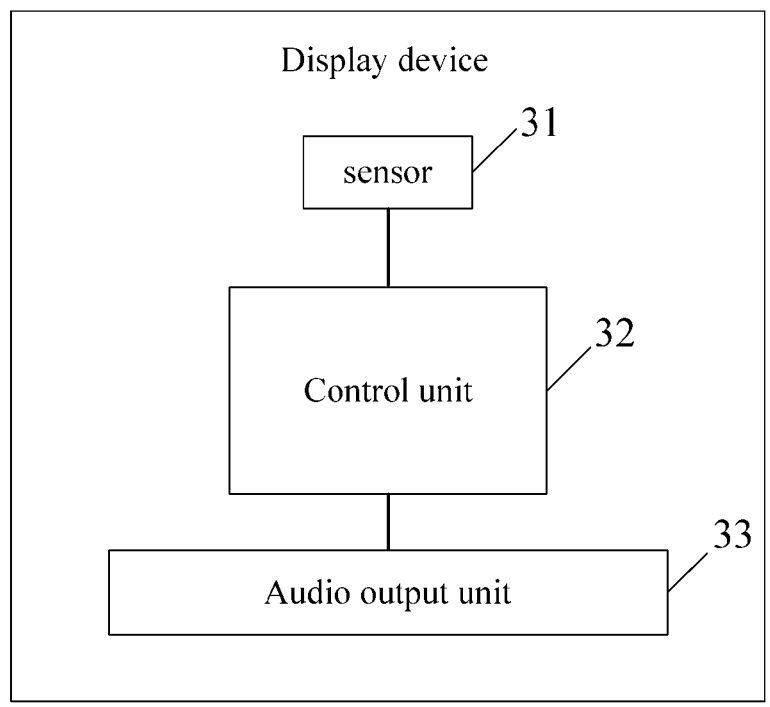
FIG. 3 is a structural schematic view of a display device according to an embodiment of the present invention.

FIG. 3 is a structural schematic view of a display device 30 according to an embodiment of the present invention. The display device 30 as shown in FIG. 3 can carry out the method for adjusting the volume of the display device as prescribed by the above FIG. 1 and FIG. 2. As shown in FIG. 3, the display device 30 according to an embodiment of the present invention comprises: a sensor 31, a control unit 32 and an audio output unit 33. Wherein the sensor 31 is used for detecting the distance between the display device 30 and the viewer, and transmitting the detected distance value to the control unit 32; the control unit 32 is used for determining a target volume to which the obtained distance corresponds, and transmitting the target volume to the audio output unit 33; the audio output unit 33 is used for outputting the audio information based on the target volume.

The working method for adjusting the volume of the display device 30 according to the present invention is as follows: firstly, the sensor 31 detects a distance between the display device 30 and the viewer; then, the control unit 32 determines a target volume based on the detected distance; finally, the audio output unit 33 outputs the audio information based on the target volume.

Compared with the prior art in which the viewer needs to adjust the volume manually, the display device 30 according to the embodiment of the present invention can adjust the playing volume of the display device 30 as a volume suitable for listening by the viewer based on the distance between the viewer and the display device 30, thereby realizing intelligent adjustment to the volume of the display device 30 and enhancing the user experience significantly.

In the display device 30 according to the present invention as shown in FIG. 3, the sensor 31 can be any sensor that can detect the distance, such as an infrared sensor, a pyroelectric sensor or a proximity sensor and so one. In addition, the sensor 31 can be arranged at a central position above the front of the display device 30. Thus the accuracy of the distance between the display device 30 and the viewer detected by the sensor can be improved.

In the display device 30 according to the present invention as shown in FIG. 3, as shown in FIG. 3, the audio output unit 33 can be located exactly under the display device 30.

In the display device 30 according to the present invention as shown in FIG. 3, the control unit 32 can be further used for receiving a volume adjustment instruction transmitted by a remote controller, and establishing a corresponding relationship between each different distance and respective different volume based on the volume adjustment instruction and the current distance between the viewer and the display device 30.

Figure 4:
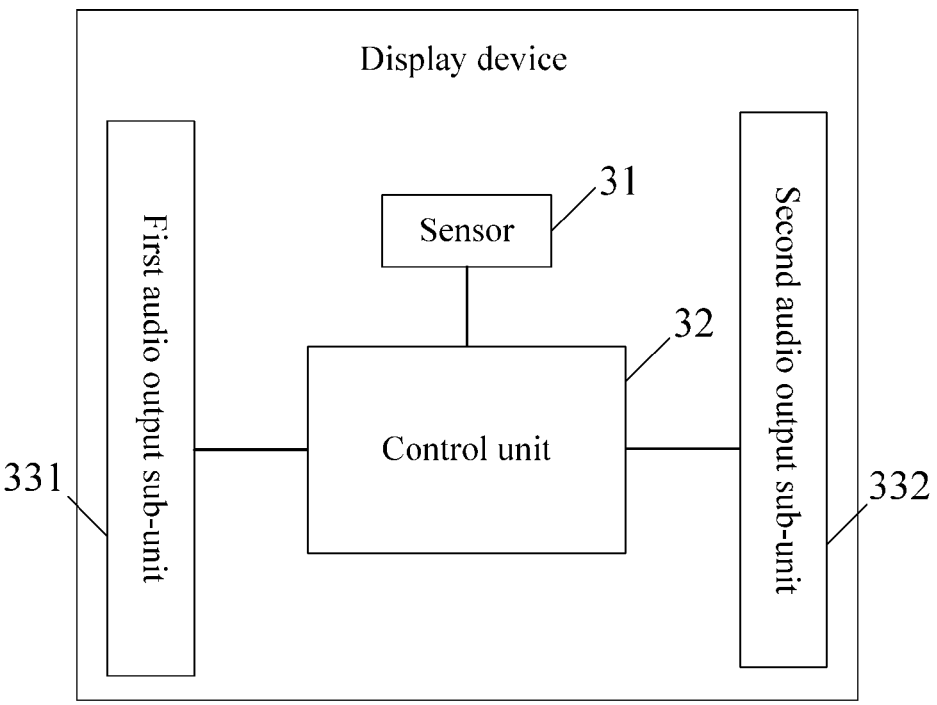
FIG. 4 is a structural schematic view of a display device according to another embodiment of the present invention.

FIG. 4 is a structural schematic view of a display device 30 according to another embodiment of the present invention. As shown in FIG. 4, the audio output unit 33 comprises a first audio output sub-unit 331 and a second audio output sub-unit 332, the first audio output sub-unit 331 and the second audio output sub-unit 332 are arranged at two sides of the display device 30 respectively.

In the description of the above implements, the specific features, structures, materials or characteristics can be combined in appropriated manners in any one or more embodiments or examples.

What are stated above are only specific implements of the present invention, however, the protection scope of the present invention is not limited thereto. Any variations or replacements in the technology coverage disclosed by the invention that can be easily conceived by the skilled person familiar with the present technical field should be covered within the protection scope of the present invention. Therefore, the protection scope of the present invention shall be subject to the protection scopes of the claims.

The invention claimed is:

1. A method for adjusting volume of a display device comprising the steps of:
   detecting a distance between a viewer and the display device;
   determining a target volume to which the detected distance corresponds;
   adjusting the volume of the display device as the determined target volume; and
   adjusting the volume of the display device as a preset high volume if no viewer is detected within the effective viewing range of the display device.

2. The method according to claim 1, wherein the step of determining a target volume to which the detected distance corresponds comprises the steps of:
   establishing a corresponding relationship between each different distance of the viewer to the display device and respective different target volume, and determining the target volume to which the detected distance corresponds based on the determined corresponding relationship.

3. The method according to claim 2, wherein the step of establishing a corresponding relationship between the distance of the viewer to the display device and the target volume comprises:
   when the viewer adjusts the volume at a certain position, detecting a first distance between the viewer and the display device, and obtaining a first volume adjusted by the viewer; and
   establishing a corresponding relationship between each different distance of the viewer to the display device and respective different target volume based on the first distance and the first volume as well as a predetermined volume adjustment step length.

4. The method according to claim 3, wherein the first distance is an optimal viewing distance, a value of the optimal viewing distance is three times of a height value of the display device.

5. The method according to claim 4,
   the preset high volume is a volume to which the optimal viewing distance corresponds.

6. The method according to claim 2, wherein the step of establishing a corresponding relationship between the distance of the viewer to the display device and the target volume comprises:
   when the viewer adjusts the volume at a certain position, detecting a first distance between the viewer and the display device, and obtaining a first volume adjusted by the viewer;
   when the viewer adjusts the volume at another position, detecting a second distance between the viewer and the display device, and obtaining a second volume adjusted by the viewer;
   in the event that the second distance is not equal to the first distance, calculating a volume adjustment step length based on the first distance, the second distance, the first volume and the second volume; and
   establishing a corresponding relationship between each distance and volume based on the first distance and the first volume as well as the volume adjustment step length.

7. The method according to claim 1, wherein the step of adjusting the volume of the display device as the determined target volume comprises:
   adjusting the volume of the display device as the target volume according to a manner of gradual adjustment.

8. The method according to claim 1, further comprising the steps of:
   if a plurality of viewers are detected within the effective viewing range, detecting a distance difference of every two viewers in the plurality of viewers to the display device; and
   if the distance difference of any two viewers to the display device is greater than a preset distance, obtaining a minimum distance in the distances between the plurality of viewers and the display device respectively, and determining a volume to which the minimum distance corresponds as the target volume; or otherwise, if there is a distance difference of two or more viewers to the display device less than or equal to the preset distance, obtaining an average value of the distances between these viewers and the display device respectively, and determining a volume to which the average value corresponds as the target volume.

9. A display device comprising: a sensor, a control unit and an audio output unit; wherein, the sensor is used for detecting a distance between the display device and a viewer, and transmitting the detected distance to the control unit;

the control unit is used for determining a target volume to which the distance corresponds, and transmitting the target volume to the audio output unit;

the audio output unit is used for outputting audio information based on the target volume, and outputting audio information based on a preset high volume if no viewer is detected by the sensor within the effective viewing range of the display device.

10. The display device according to claim 9, wherein the sensor is located at a central position above the front of the display device.

11. The display device according to claim 9, wherein the audio output unit is located exactly under the display device; or the audio output unit comprises a first audio output sub-unit and a second audio output sub-unit, the first audio output sub-unit and the second audio output sub-unit are located at two sides of the display device respectively.

12. The display device according to claim 9, wherein the control unit is further used for receiving a volume adjustment instruction transmitted by a remote controller used in cooperation with the display device, and establishing a corresponding relationship between each different distance and respective different volume based on the volume adjustment instruction and the current distance between the viewer and the display device.

13. The display device according to claim 9, wherein the sensor is an infrared sensor, a pyroelectric sensor or a proximity sensor.

\* \* \* \* \*